(12) United States Patent
Djadi et al.

(10) Patent No.: US 9,178,592 B1
(45) Date of Patent: Nov. 3, 2015

(54) SYSTEMS AND METHODS USING MULTIPLE INTER-CHIP (IC) LINKS FOR ANTENNA DIVERSITY AND/OR DEBUG

(71) Applicant: Silicon Laboratories Inc., Austin, TX (US)

(72) Inventors: Younes Djadi, Austin, TX (US); Russell Croman, Buda, TX (US); Russell Schultz, Austin, TX (US); Scott T. Haban, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/340,004

(22) Filed: Jul. 24, 2014

(51) Int. Cl.
H03B 1/02 (2006.01)
H04B 7/06 (2006.01)
H04B 1/00 (2006.01)

(52) U.S. Cl.
CPC ............... *H04B 7/06* (2013.01); *H04B 1/0007* (2013.01)

(58) Field of Classification Search
CPC ............... H04B 1/00; H04B 1/10; H04B 1/02
See application file for complete search history.

(56) References Cited

U.S. PATENT DOCUMENTS

| 4,380,767 | A | | 4/1983 | Goldstein et al. |
|---|---|---|---|---|
| 4,450,585 | A | * | 5/1984 | Bell ............................. 455/135 |
| 4,972,434 | A | | 11/1990 | Le Polozec et al. |
| 6,151,316 | A | | 11/2000 | Crayford et al. |
| 6,172,970 | B1 | | 1/2001 | Ling et al. |
| 6,614,770 | B1 | | 9/2003 | Kayama et al. |
| 6,735,257 | B2 | | 5/2004 | Kroeger |
| 6,792,258 | B1 | | 9/2004 | Nokes et al. |
| 6,853,694 | B1 | | 2/2005 | Beaudin et al. |
| 6,993,297 | B2 | | 1/2006 | Smith, Jr. |
| 7,103,340 | B2 | * | 9/2006 | Spencer et al. ............... 455/272 |
| 7,103,830 | B1 | | 9/2006 | Dong |
| 7,142,583 | B2 | * | 11/2006 | Lysejko et al. ................ 375/144 |
| 7,143,226 | B2 | | 11/2006 | Fields, Jr. et al. |
| 7,403,066 | B2 | | 7/2008 | Williams |

(Continued)

FOREIGN PATENT DOCUMENTS

| EP | 1646157 A2 | 4/2006 |
|---|---|---|
| EP | 1646160 A2 | 4/2006 |
| WO | WO99/08400 | 2/1999 |

OTHER PUBLICATIONS

Elenes, "Methods and Systems for Blending Between Analog and Digital Broadcast Signals", U.S. Appl. No. 13/906,607, filed May 31, 2013, 27 pgs.

(Continued)

*Primary Examiner* — Jaison Joseph
(74) *Attorney, Agent, or Firm* — Egan, Peterman & Enders LLP.

(57) ABSTRACT

Systems and methods are disclosed that implement multiple inter-chip (IC) links to communicate digital signals and data between multiple tuner circuit chips of a radio frequency (RF) antenna diversity system. The multiple IC communication links may be employed, for example, to simultaneously communicate different signals and/or data between individual tuner circuit chips of a multi-signal type antenna diversity system in an asynchronous manner, and may be employed to achieve simultaneous antenna diversity for multiple RF signal types using a scalable IC communication link architecture that includes multiple IC communication links to interconnect a varying number of RF tuner circuit chips.

30 Claims, 6 Drawing Sheets

(56) References Cited

U.S. PATENT DOCUMENTS

| | | |
|---|---|---|
| 7,583,627 B2 | 9/2009 | Hirsch |
| 7,788,053 B2 | 8/2010 | Sutardja |
| 7,788,257 B2 | 8/2010 | Kihneman et al. |
| 8,072,995 B2 | 12/2011 | Lenell |
| 8,107,641 B2 | 1/2012 | Sakata et al. |
| 8,331,887 B2 | 12/2012 | Tuttle et al. |
| 8,548,031 B2 | 10/2013 | Djadi et al. |
| 2002/0160737 A1* | 10/2002 | Crawford ............... 455/272 |
| 2006/0073797 A1 | 4/2006 | Kent et al. |
| 2006/0194562 A1* | 8/2006 | Marrah et al. ............ 455/334 |
| 2006/0286948 A1* | 12/2006 | Taniguchi et al. ......... 455/140 |
| 2007/0127609 A1* | 6/2007 | Kawada et al. ............ 375/347 |
| 2007/0135154 A1* | 6/2007 | Gautier et al. ............ 455/522 |
| 2008/0282005 A1 | 11/2008 | Chencinski et al. |
| 2009/0041169 A1 | 2/2009 | Fujita et al. |
| 2009/0080559 A1 | 3/2009 | Armbruster et al. |
| 2009/0086868 A1 | 4/2009 | Shiraishi et al. |
| 2009/0207927 A1* | 8/2009 | Watanabe et al. .......... 375/260 |
| 2010/0062737 A1* | 3/2010 | Zhong et al. ............ 455/277.1 |
| 2010/0199158 A1 | 8/2010 | Friedman et al. |
| 2011/0158298 A1 | 6/2011 | Djadi et al. |
| 2011/0158339 A1 | 6/2011 | Tuttle et al. |
| 2011/0158357 A1* | 6/2011 | Djadi et al. ............... 375/344 |
| 2012/0099625 A1* | 4/2012 | Djadi et al. ............... 375/219 |

OTHER PUBLICATIONS

Silcon Labs, "Broadcast FM Radio Transceiver for Portable Applications", SI4720/21-B20, 2008, 48 pgs.

Shatara, SAE Technical Paper Series, "Dual Receiver With Phase and Switched Diversity for Background Processing and Reception Improvement", 2008, 7 pgs.

\* cited by examiner

SYSTEMS AND METHODS USING MULTIPLE INTER-CHIP (IC) LINKS FOR ANTENNA DIVERSITY AND/OR DEBUG

FIELD OF THE INVENTION

This disclosure generally relates to tuner circuitry and, more particularly, to multi-chip tuner circuitry.

BACKGROUND

In radio receivers, received radio frequency signals are frequently a combination of signals, some received directly from a transmitting antenna and some reflected from stationary and/or moving objects. In the worst case, the received signals from the direct and alternate path signals combine at the receiving antenna to cause destructive interference. Such interference makes decoding of the signals more difficult. Further, in some instances, interference can reduce the amplitude of the received signals to a level that is too low for reliable decoding by the receiver. Such amplitude reduction is sometimes referred to as multi-path fading.

One technique for improving signal reception under multi-path fading and weak signal conditions includes the use of multiple antennas and receiver circuits in an antenna diversity system. In a multi-chip antenna diversity system, multiple tuner circuits that are tuned to particular frequencies receive program content (channel information) from more than one direction or at slightly different positions. Such antenna diversity systems typically include processor circuitry configured to combine signals from the different tuners to produce an enhanced signal or to select a particular signal from a tuner having the strongest signal output.

Diversity reception makes use of statistically independent signal streams to reduce the impact of severe multipath-related channel fading. However, digital communications between the multiple tuner circuits and associated processing circuitry can radiate spectral energy at radio frequencies to which one or more of the tuner circuits are tuned, further complicating signal reception.

FIG. 1 illustrates a conventional FM antenna diversity system 100 having two or more antennas $104_1$-$104_N$ that are spaced apart at a known distance and are configured to receive a FM radio frequency signal. FM antenna diversity system 100 includes two or more FM tuner circuits $102_1$-$102_N$ that are each an individual chip that is connected to a respective one of independent antennas $104_1$-$104_N$, and that is configured to receive FM radio frequency signals 105 from its given antenna 104 within a particular frequency band or channel to which the given FM tuner circuit 102 is tuned. The multiple FM tuner circuits $102_1$-$102_N$ are interconnected as shown by segments of uni-directional inter-chip (IC) communications link 120 via inter-chip communications circuitry provided for each tuner circuit 102 in the form of a respective IC communication link transmitter circuit 114 and a respective IC communication link receiver circuit 118 that are configured to communicate control/status information, intermediate frequency (IF), and audio data content from received FM radio frequency signals using inter-chip (IC) link frames in one direction from tuner circuit $102_N$ toward tuner circuit $102_1$ across inter-chip communication link 120. These IC communication link (ICLINK) frames include frame synchronization information and three data channels, i.e., two synchronous streaming data channels that have a rate synchronous with ICLINK frame rate and a programmable word width of 24 or 32 bits, and one streaming/packetized messaging channel that sends a single data packet over multiple frames using any available bandwidth. The two synchronous streaming data channels are used for transmitting FM IF data or FM audio data. The single streaming/packetized messaging channel is used for sending messages between MCUs of the tuner circuits 102. Idle bits are sent when no data is available.

As shown in FIG. 1, system 100 also includes crystal oscillator 106 that provides an oscillator reference frequency that is used to produce a common reference clock signal 130 that is shared by the FM tuner circuits $102_1$-$102_N$. Further information on antenna diversity systems and an IC communication link employing inter-chip link frames may be found in U.S. Pat. No. 8,548,031; U.S. Pat. No. 8,331,887; and United States Patent Application Publication No. 2011/0158298.

Still referring to FIG. 1, each of FM tuner circuits $102_1$-$102_N$ includes analog FM receiver circuitry 108 that is coupled to independently receive FM radio frequency (RF) signals 105 from its respective coupled antenna 104. Each analog FM receiver circuit 108 utilizes the reference clock signal 130 to mix with its respective received FM radio frequency signals 105 to produce IF FM signals, such as low IF or zero IF signals, that are provided to an analog to digital converter (ADC) 112 of the same respective tuner circuit 102. In the case of all tuner circuits except tuner circuit $102_N$, ADC 112 of each tuner circuit 102 digitizes the received IF signals to produce digitized versions of the IF signals that are provided as IF FM data to the digital signal processor (DSP) 116 of the same FM tuner circuit 102, which performs signal processing and/or demodulation operations to obtain an audio signal from the incoming FM signal. Further, as shown each tuner circuit $102_1$ to $102_N$ includes a respective micro-controller unit (MCU) 110 that is configured to control operation of its respective tuner circuit 102, and that is coupled through a control interface to a data circuit (host processor) not shown.

In the conventional FM antenna diversity system 100 of FIG. 1, the DSP 116 of each FM tuner circuit $102_1$-$102_{N-1}$ can demodulate the IF data provided from the ADC 112 of its own respective tuner circuit 102 to produce FM audio signals. The DSP 116 of each FM tuner circuit $102_1$-$102_{N-1}$ can also combine the IF data of its own tuner circuit 102 with IF data received from a DSP 116 of another tuner circuit 102 across an inter-chip communications link 120 to produce combined FM IF data, which it can also demodulate to produce FM audio signals. In either case, each FM tuner circuit $102_2$-$102_N$ can send its demodulated FM audio signals out across inter-chip communications link 120 to the next preceding FM tuner circuit 102 as shown in FIG. 1. Since tuner circuit $102_N$ of FIG. 1 has no DSP 116, ADC $112_N$ of tuner circuit $102_N$ provides its IF FM data across IC communication link 120 to DSP $112_{N-1}$ of tuner circuit $102_{N-1}$ where IF FM data of tuner circuit $102_N$ is combined with IF FM data of tuner circuit $102_{N-1}$ and then demodulated and provided to the DSP $112_{N-2}$ of the next tuner circuit $102_{N-2}$ across IC communication link 120. In the conventional system 100 of FIG. 1, all final signal combining is performed by DSP $116_1$ of tuner circuit $102_1$ as shown to produce a combined demodulated FM audio signal.

Still referring to the conventional architecture of FIG. 1, the MCU $110_1$ of tuner circuit $102_1$ controls the DSP $116_1$ of tuner circuit $102_1$ to process the signal data received from other tuner circuits $102_2$-$102_N$ across IC communication link 120 according to a selected operating mode, i.e., a phase diversity mode, a switching antenna mode, or an alternate frequency scan mode.

In a phase diversity mode, the DSP $116_1$ synchronizes DSP frames including the digitized version of the IF signal and signal data within an IC communication link frame received across IC communication link 120 from upstream tuner circuit/s $102_2$-$102_N$, performs maximal ratio combining or other similar digital signal processing techniques to coherently combine the IF signal from tuner circuit $102_1$ and the $102_2$-$102_N$, and then demodulates this combined IF signal to provide the combined audio signal through a digital interface 150 to the data circuit.

In a switching antenna mode, each of the tuner circuits $102_1$-$102_N$ operate independently, and the signal reception is improved by continuously monitoring the signal quality metrics calculated from the digitized version of the IF signal as compared to the IF signal metrics received within IC communication link frames from the IC communication link 120. In this operating mode, the DSP $116_1$ is configured to select between the signals of the multiple antennas $104_1$-$104_N$ based on the signal metrics and to provide the stronger signal as a demodulated audio signal to the data circuit through the digital interface 150.

In an alternate frequency scan, the data circuit controls the multiple tuner circuits $102_1$-$102_N$ to use the IC communication link 120 to continue listening to a selected one of the multiple tuner circuits $102_1$-$102_N$ having the strongest signal and controls the other tuner circuits 120 to tune to the same content at another frequency to check the associated signal quality metrics. Depending on the results, the coupled data circuit may decide to control the multiple tuner circuits $102_1$-$102_N$ to operate in phase diversity mode or switched antenna diversity mode at the new frequency.

SUMMARY OF THE INVENTION

Disclosed herein are systems and methods that implement multiple inter-chip (IC) communication links (or IC Links) to communicate digital signals and data between multiple tuner circuit chips of a radio frequency (RF) antenna diversity system. In one exemplary embodiment, the multiple IC communication links may be employed to simultaneously communicate different signals and/or data between individual tuner circuit chips of a multi-signal type antenna diversity system, e.g., in an asynchronous manner. Advantageously, the disclosed systems and methods may be implemented in one embodiment to achieve simultaneous antenna diversity for multiple different RF signal types (e.g., broadcast analog modulated FM band signal type and broadcast digital modulated FM band signal type, broadcast FM band signal type and broadcast AM band signal type, etc.) using a scalable IC communication link architecture that includes multiple IC communication links to interconnect a varying number of RF tuner circuit chips, e.g., from a minimum of two interconnected RF tuner circuit chips to a larger number of three or more such chips. Using the disclosed systems and methods, antenna diversity operations may be implemented using a variety of architectures and network configurations, e.g., using a cascade configuration, star configuration, etc.

In one embodiment, the multiple IC communication links may be employed to provide simultaneous and asynchronous communication of signals and data between multiple tuner circuit chips of a multi-signal type antenna diversity system that employ different tuner circuit chips for reception and processing of different RF signal types (e.g., different frequency bands and/or different types of transmitted RF signal modulations such as analog and digital modulation types). Examples of types of digital signals and data that may be so communicated between the multiple tuner circuit chips of an antenna diversity system include individual or combined digitized IF signals, demodulated audio data from individual or combined digitized IF signals, debug data and/or other control/status information between multiple tuner circuit chips of an antenna diversity system.

In the practice of the disclosed systems and methods, multiple IC communication links may be used to communicate signals and data between multiple tuner circuit chips of a multi-signal type antenna diversity system in the same direction or in different directions. However, in one embodiment, multiple IC communication links may be used to bi-directionally communicate signals and data between multiple tuner circuit chips of a multi-signal type antenna diversity system, e.g., with a first IC communication link being used to communicate signals and/or data in a first direction between at least two tuner circuit chips of the antenna diversity system while a second and different IC communication link is used to simultaneously communicate signals and/or data in a second and opposite direction between the same at least two tuner circuit chips of the antenna diversity system. In a further exemplary embodiment, debug data from any one of the multiple tuner circuit chips of an antenna diversity system may be communicated through a separate IC communication link data channel, e.g., to be captured by a an external data logger.

In one respect, disclosed herein is an antenna diversity system, including: at least two radio frequency (RF) tuner circuits coupled together by at least a first segment of a first inter-chip (IC) communication link and at least a first segment of a second IC communication link, the two RF tuner circuits being configured to simultaneously communicate at least one of digital streaming data, non-streaming digital packetized data, or a combination thereof simultaneously across the first segment of the first IC communication link and across the first segment of the second IC communication link. Each given one of the two RF tuner circuits may have a RF input that is configured to receive RF signals of a RF spectrum and at least one digital output that is configured to produce at least one digital output signal that is based at least in part on the RF signals received by the RF input of the given RF tuner circuit, digital streaming data received from the other RF tuner circuit across at least one of the first segment of the first IC communication link or the first segment of the second IC communication link, or a combination thereof.

In another respect, disclosed herein is a radio frequency (RF) tuner circuit, including: a first digital signal processor (DSP) coupled to receive a digital signal related to a first type RF signal received by a RF input of the RF tuner circuit; a first inter-chip (IC) receiver circuit configured to be coupled between the first DSP and a first segment of a first IC communication link, the first IC receiver link being configured to provide first type RF signal streaming data received from the first segment of the first IC communication link to the first DSP, and the first DSP being configured to produce at least one first digital output signal based at least in part on the digital signal that is derived from the received first type RF signal, the first type RF signal streaming data, or a combination thereof; and a first IC transmitter circuit coupled to receive a second digital output signal that is based at least in part on a digital signal derived from a second type RF signal received by a RF input of the RF tuner circuit, a second type RF signal streaming data, or a combination thereof. The first IC transmitter circuit may be configured to be coupled to simultaneously transmit the second digital output signal to a first segment of a second IC communication link at the same time that the first IC receiver circuit is receiving the first type RF signal streaming data from the first segment of the first IC communication link and providing the received first type RF signal streaming data to the first DSP, and the first type RF signal and the second type RF signal may be different types of RF signals.

In another respect, disclosed herein is a scalable antenna diversity system, including at least first and second radio frequency (RF) tuner circuits coupled together by a first segment of a first inter-chip (IC) communication link and a first segment of a second IC communication link. The first RF tuner circuit may include a first digital signal processor (DSP) coupled to receive at least one of a digital signal derived from a first type RF signal received by a RF input of the first RF tuner circuit or first type RF signal streaming data received across the first segment of the first IC communication link from the second RF tuner circuit, where the first DSP of the first RF tuner circuit is configured to produce at least one first output signal based at least in part on the digital signal that is derived from the received first type RF signal, the first type RF signal streaming data received from the second RF tuner circuit across the first segment of the first IC communication link, or a combination thereof. The second RF tuner circuit may include a first DSP coupled to receive at least one of a digital signal derived from a second type RF signal or second type RF signal streaming data across the first segment of the second IC communication link from the first RF tuner circuit, where the first DSP of the second RF tuner circuit is configured to produce at least one second output signal based at least in part on the digital signal that is derived from the received second type RF signal, the second type RF signal streaming data received from the second RF tuner circuit across the first segment of the second IC communication link, or a combination thereof. The first type RF signal and the second type RF signal may be different types of RF signals.

In another respect, disclosed herein is a method, including: simultaneously communicating at least one of digital streaming data, non-streaming digital packetized data, or a combination thereof between at least two radio frequency (RF) tuner circuits across a first segment of a first inter-chip (IC) communication link and across a first segment of a second IC communication link; receiving RF signals of a RF spectrum at a RF input of each of the two RF tuner circuits; and producing at least one digital output from each given one of the two RF tuner circuits that is based at least in part on the RF signals received by the RF input of the given RF tuner circuit, the digital streaming data received by the given RF tuner circuit from the other RF tuner circuit across at least one of the first segment of the first IC communication link or the first segment of the second IC communication link, or a combination thereof.

DESCRIPTION OF ILLUSTRATIVE EMBODIMENTS

Figure 1:
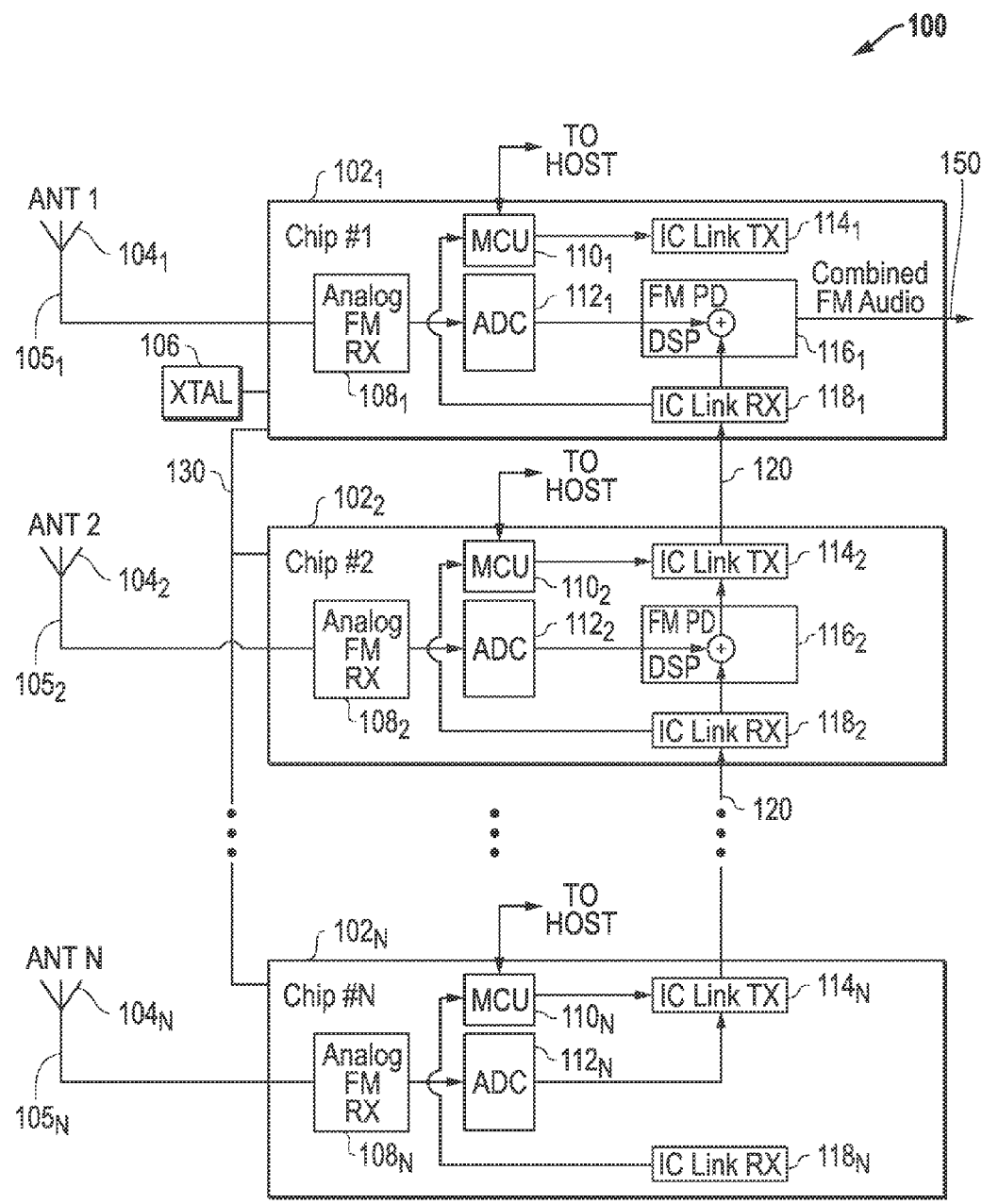
FIG. 1 is a simplified block diagram illustrating conventional FM antenna diversity system.
Figure 2:
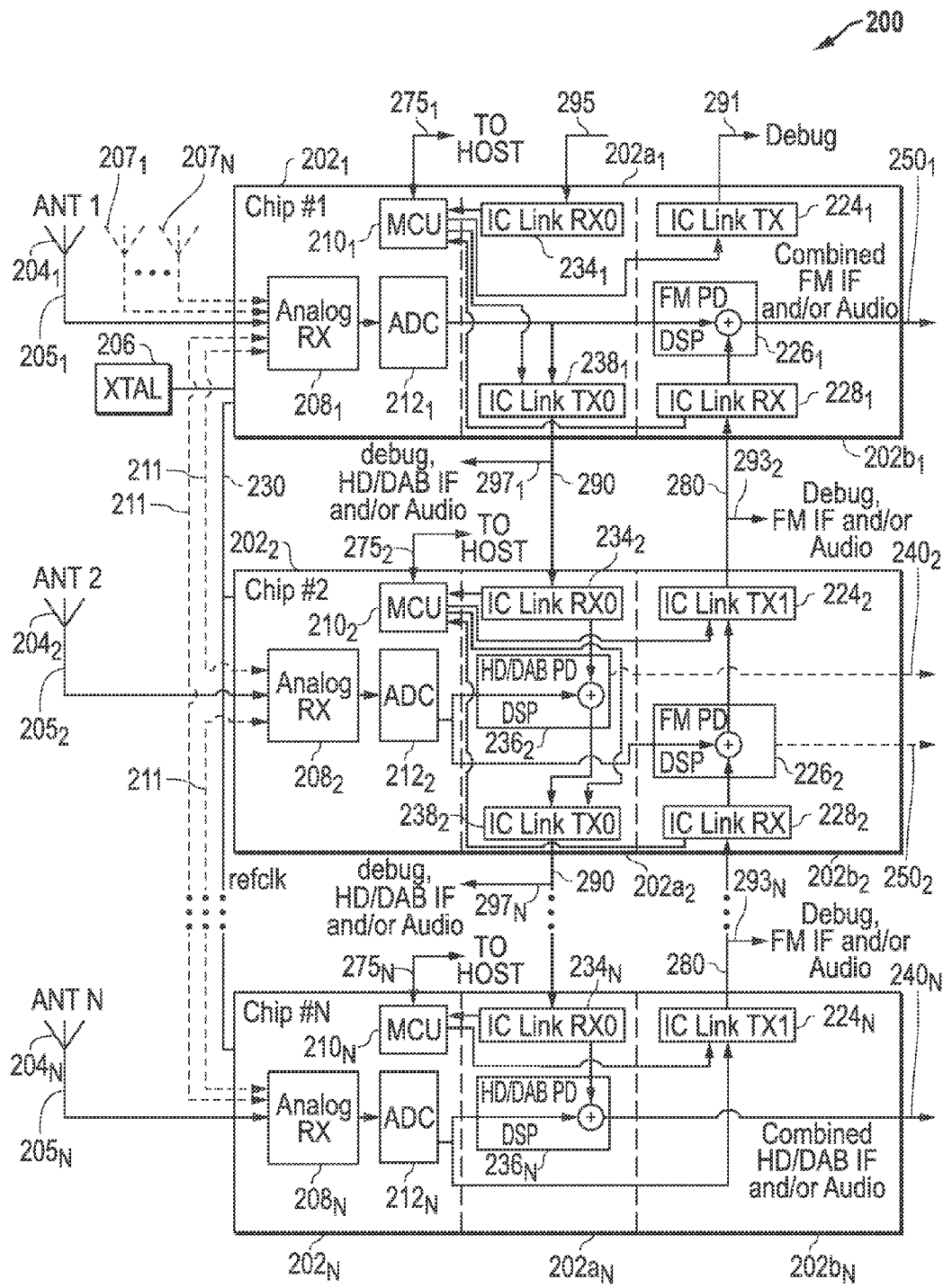
FIG. 2 illustrates a block diagram of a multiple-signal type antenna diversity system configured according to one exemplary embodiment of the disclosed systems and methods.

FIG. 2 illustrates one exemplary embodiment of a dual-signal type radio frequency (RF) antenna diversity system 200 having two or more RF tuner circuits $202_1$-$202_N$ that are each coupled to at least one of respective antennas $204_1$-$204_N$ as shown. Antennas $204_1$-$204_N$ may in one embodiment be spaced apart at a known distance. Each of RF tuner circuits $202_1$-$202_N$ may each be an individual semiconductor chip or integrated circuit (IC) that is configured to receive RF signals 205 from its given antenna 204 within one or more particular frequency bands or channels to which the given tuner circuit 202 is tuned, e.g., broadcast analog FM band signals and/or broadcast digital FM band High Definition™ or Digital Audio Band signals (i.e., HD/DAB signals). It will be understood that in one embodiment, each of tuner circuits $202_1$-$202_N$ may be configured together with its corresponding antenna 204 to receive RF signals in a single common frequency band, such as broadcast FM band signals, e.g., from which both digital and analog modulated FM signals may be tuned.

It will be understood that in one embodiment, one or more of tuner circuits $202_1$-$202_N$ may be configured to receive RF signals from its corresponding antenna 204 of a signal type that differs from the signal type received by one or more other tuner circuits $202_1$-$202_N$ from their corresponding antennas 104. For example, in on embodiment, at least one of tuner circuits 202 may be configured to receive first frequency band/modulation type signals (e.g., broadcast analog FM band signals) from its corresponding antenna 104, and at least one other of tuner circuits 202 may be configured to receive second band/modulation type signals (e.g., broadcast analog AM band signals) from its corresponding antenna 104. Similarly, it is possible that yet another one of tuner circuits 202 and its corresponding antenna 104 may be configured to receive yet a third different signal type (e.g., broadcast digital FM band HD signals in either of AM or FM frequency bands, broadcast DAB signals, etc.) from its corresponding antenna 104, it being understood that additional tuner circuit/s 202 may be configured to receive more than three different RF signal types in a similar manner. It will be understood that the preceding examples of RF signal types are exemplary only, and that an RF antenna diversity system 200 may include individual tuner circuits 202 and antennas 204 that are configured to receive and process any other RF signal type or combination of other RF signal types including, for example, broadcast analog AM, broadcast digital DAB, broadcast digital L-Band, broadcast Digital Radio Mondiale (DRM), broadcast Compatible AM-Digital (CAM-D), etc.

As further shown in FIG. 2, system 200 includes crystal oscillator 206 that provides an oscillator reference frequency that is used to produce a common reference clock signal 230 that is shared by the tuner circuits $202_1$-$202_N$ as shown. Moreover, in the exemplary embodiment of FIG. 2, each of RF tuner circuits $202_1$-$202_N$ includes receiver circuitry 208 that is coupled to receive RF signals 205 of a RF spectrum from at least one respective coupled antenna 204, it being understood that one or more additional RF antennas 207 may be optionally coupled to receiver circuitry 208 of one or more of tuner circuits 202 as shown for tuner circuit $202_1$, e.g., for purposes of allowing a given tuner circuit 202 to selectably process signals received from different broadcast RF signal frequency bands and/or modulation, such as analog FM and AM bands (including digital HD Radio or CAM-D in those bands), L band or band III (DAB), DRM, etc. In an embodiment where each of RF tuner circuits $202_1$-$202_N$ includes one or more additional RF antennas $207_1$-$207_N$, different system operational modes are possible depending on which RF antenna 207 or 204 is selected for each RF tuner circuit 202. For example, each of RF tuner circuits $202_1$-$202_N$ may select its appropriate coupled RF antenna 207 or 204 that allows it to tune to the same broadcast RF signal type (e.g., such as digital FM HD/DAB) as each of other RF tuner circuits 202 so as to allow system 200 to operate in a phase diversity operational mode. Alternatively, each of RF tuner circuits $202_1$-$202_N$ may select its appropriate coupled RF antenna 207 or 204 so as to allow it to tune to a different broadcast RF signal type than one or more other RF tuner circuits 202 so as to allow system 200 to simultaneously receive and process audio from different broadcast RF signal types.

As shown in FIG. 2, also possible are optional RF signal feed-through paths 211 that may be provided to route RF signals between receiver circuitries 208 of different RF tuner circuits 202, e.g., to allow RF signals 205 of a RF spectrum received from any given antenna $204_1$-$204_N$ (or optionally from any other antennas 207) to be communicated to a receiver circuitry 208 of any selected one of tuner circuits $202_1$-$202_N$ for mixing, demodulation, etc. Thus, in one exemplary embodiment, the RF input of any given RF tuner circuit chip 202 may be connected directly to an antenna 204, or to an RF signal feed-through path 211 of any other RF tuner circuit chip 202.

In any case, a given antenna 204 may be configured to receive and provide RF signals 205 of a received RF spectrum that contains a single given first RF signal type (e.g., broadcast analog FM band signals) to receiver circuitry 208 of a given tuner circuit 202, or may be configured to receive and provide RF signals of a received RF spectrum that includes multiple RF signal types (e.g., analog AM, analog FM, digital HD, DAB) to receiver circuitry 208 of a given tuner circuit 202 as illustrated by antenna $204_2$ and RF signals $205_2$ which are provided via ADC $212_2$ to each of HD/DAB DSP $236_2$ and FM DSP $226_2$ of the same tuner circuit $202_2$.

In the exemplary dual-signal type embodiment of FIG. 2, each receiver circuit 208 utilizes the reference clock signal 230 to mix with its respective received RF signals 205 to produce IF signals, such as low IF or zero IF signals, that are provided to an analog to digital converter (ADC) 212 of the same respective tuner circuit 202. Further, as shown each tuner circuit $202_1$ to $202_N$ includes a respective micro-controller unit (MCU) 210 that is configured to control operation of its respective tuner circuit 202, and that is coupled through a control interface to a data circuit (e.g., such as a host processor, digital logic, other circuitry, or any combination thereof). The MCU 210 of each given RF tuner circuit 202 may be configured in one embodiment to control operation of the respective HD/DAB DSP 236 and/or FM DSP 226 of the given RF tuner circuit 202 in response to control signals 275 received from a host data circuit as shown. In this regard, the MCU 210 of each given RF tuner circuit 202 may control operation of each of HD/DAB DSP 236 and FM DSP 226 of the given RF tuner circuit 202, as well as control communication of data across inter-chip (IC) communication link 0 290 and IC communication link 1 280, in order to achieve the various RF signal demodulation, data routing, combining, and data output operations described below in relation to FIGS. 2-6, e.g., in a simultaneous and/or asynchronous manner.

In the case of RF tuner circuits $202_1$-$202_{N-1}$ of the dual-signal type embodiment of FIG. 2, ADC 212 of each RF tuner circuit 202 digitizes the received IF signals to produce digitized versions of the IF signals that include first type IF data (e.g., from broadcast analog FM signals) that is provided to an FM digital signal processor (DSP) 226 of the same RF tuner circuit 202, which performs signal processing and/or demodulation operations to obtain an FM audio signal from the incoming FM signal. In the case of tuner circuits $202_2$-$202_N$, ADC 212 of each tuner circuit 202 digitizes the received IF signals to produce digitized versions of the IF signals that include second type IF data (e.g., from broadcast digital FM HD/DAB signals) that is provided to an HD/DAB digital signal processor (DSP) 236 of the same RF tuner circuit 202, which performs signal processing and/or demodulation operations to obtain an HD/DAB audio signal in the incoming HD/DAB signal. Thus, each of intermediate tuner circuits $202_2$-$202_{N-1}$ is provided with multiple (in this case two) DSP circuits 226 and 236 configured to receive and process IF data from multiple received signal types (analog FM band signal type and digital FM band HD/DAB signal type), although it will be understood that in other embodiments tuner circuits 202 may be provided that are configured with three or more DSP circuits configured to receive and process three or more corresponding different received signal types. Further information on example HD/DAB and FM tuner circuitry may be found in U.S. patent application Ser. No. 13/906,607, filed May 31, 2013, which is incorporated herein by reference in its entirety.

Still referring to FIG. 2, each of tuner circuits $202_1$ and $202_N$ are configured as both an initial tuner circuit for one of the dual RF signal types of system 200 and as a terminal tuner circuit for the other of the dual RF signal types of system 200. In this regard, RF tuner circuit $202_1$ is configured as both a terminal FM RF tuner circuit $202b_1$ having a single DSP circuit configured to receive and process FM IF data from the other intermediate and initial FM tuner circuits $202b$, and as an initial HD/DAB RF tuner circuit $202a_1$ having no HD/DAB DSP. Similarly, tuner circuit $202_N$ is configured as both a terminal HD/DAB RF tuner circuit $202a_N$ having a single DSP circuit configured to receive and process HD/DAB IF data from the other intermediate and initial FM tuner circuits 202, and as an initial FM RF tuner circuit $202b_N$ having no FM DSP. However, in alternate embodiments one or both of end tuner circuits $202_1$ and $202_N$ may be configured as a terminal tuner circuit for both RF signal types of a dual RF signal type system, e.g. having both FM and HD/DAB DSPs. This may be implemented, for example, in one embodiment where multiple separate IC communication links are configured to communicate data in the same direction between multiple RF tuner circuits 202.

As illustrated in FIG. 2, multiple RF tuner circuits $202_1$-$202_N$ may be interconnected as shown by at least two inter-chip (IC) communication links 280 and 290 via inter-chip communications circuitry components provided for each tuner circuit 202. In this exemplary embodiment, each of RF tuner circuits $202_1$-$202_N$ includes a corresponding IC communication link 0 receiver circuit 234, and each of RF tuner circuits $202_1$-$202_{N-1}$ also includes a respective IC communication link 0 transmitter circuit 238. Further information on an example individual IC communication link employing an IC communication link transmitter circuit and IC communication link receiver circuit may be found in U.S. Pat. No. 8,548,031; U.S. Pat. No. 8,331,887; and United States Patent Application Publication No. 2011/0158298; each of which is incorporated herein by reference in its entirety.

As further shown, each of RF tuner circuits $202_1$-$202_N$ of the exemplary embodiment of FIG. 2 also includes a corresponding IC communication link 1 transmitter circuit 224, and each of RF tuner circuits $202_1$-$202_{N-1}$ includes a respective IC communication link 1 receiver circuit 228. It will be understood that each IC communication link 1 transmitter circuit 224 and corresponding IC communication link 1 receiver circuit 228 may be provided as separate circuits or may be combined into a single IC communication link 1 transceiver circuit for each corresponding RF tuner circuit 202. Similarly, each IC communication link 0 transmitter circuit 238 and corresponding IC communication link 0 receiver circuit 234 may be provided as separate circuits or may be combined into a single IC communication link 0 transceiver circuit for each corresponding RF tuner circuit 202. As described herein, IC communication link 1 transmitter circuits $224_2$-$224_N$ may be provided for purposes of communicating between chips, e.g., to deliver analog FM IF data from all RF tuner circuits $202_2$-$202_N$ to RF tuner circuit $202_1$ for diversity combining, FM audio demodulation, etc. In one embodiment, each of IC communication link 1 transmitter circuits $224_2$-$224_N$ may also communicate FM audio between RF tuner circuits 202 that has been demodulated by other RF tuner circuits 202. In the illustrated embodiment, an optional additional IC communication link 1 transmitter circuit $224_1$ may be provided for purposes of communicating debug information to off-chip circuitry without disturbing the running system, e.g., which may already be using IC communication link 1 transmitter circuits $224_2$-$224_N$ for normal operation without spare bandwidth to carry the debug information.

Using the disclosed systems and methods, separate segments of IC communication link 0 290 may be configured to operate under the control of MCUs $210_1$-$210_N$ to communicate control/status information, intermediate frequency (IF), in-phase and quadrature (IQ) data, audio data content, and/or debug data (e.g., such as internal firmware data buffers containing partially-processed data, program state, etc.) on separate channels between RF tuner circuits 202 using inter-chip link frames in a first direction shown by the arrows from tuner circuit $202_1$ towards tuner circuit $202_N$ across segments of IC communication link 0 290. Separate segments of IC communication link 1 280 may be configured to operate under the control of MCUs $210_1$-$210_N$ to communicate control/status information, IF data, IQ data, audio data content, and/or debug data on separate channels between RF tuner circuits 202 using inter-chip link frames in a second and opposite direction as shown by the arrows from tuner circuit $202_N$ toward tuner circuit $202_1$ across segments of IC communication link 1 280. Thus, dual uni-directional IC communication links 280 and 290 of this embodiment are provided and utilized to enable bi-directional communication of data between tuner circuits $202_1$-$202_N$. However, in an alternate embodiment, two or more IC communication links may be configured to operate under the control of MCUs $210_1$-$210_N$ to communicate control/status information, intermediate frequency (IF) data, audio data content, and/or debug data on separate channels between RF tuner circuits 202 using inter-chip link frames in the same direction. Moreover, each of IC communication link 0 290 and IC communication link 1 280 may also be configured to operate under the control of MCUs $210_1$-$210_N$ to allow any RF tuner chip 202 to communicate debug data, IF data and/or audio data to other off-chip circuitry (e.g., such as a data logger, host processing device, external demodulator chip, etc.) via off chip data links 291, 293 and 297 as shown. In one embodiment, a debug data buffer may be sent from memory that is utilized by a DSP 226 (e.g., DSP random access memory), and may be relatively large in comparison to the size of an IC communication link frame such that the debug buffer is sent across multiple IC communication link frames, e.g., to off chip circuitry for observation by a programmer for debug purposes. In one embodiment, the debug data may be sent at a single time, and does not have to be sent repeatedly.

In the dual-signal type antenna diversity system embodiment 200 of FIG. 2, the FM DSP 226 of each RF tuner circuit $202_1$-$202_{N-1}$ may be configured to combine the FM IF data provided from the ADC 212 of its own respective tuner circuit 202 with FM IF data received from a DSP 226 of another upstream tuner circuit 202 via its IC communication link receiver 228 from across one or more segments of inter-chip communications link 280 to produce combined FM IF data. In this regard, each intermediate RF tuner circuit $202_2$-$202_{N-1}$ may then output its combined FM IF data via its respective IC communication link transmitter 224 to the next downstream tuner circuit 202 across a segment of IC communication link 1 280. The terminal FM RF tuner circuit $202b_1$ may be configured to demodulate its combined FM IF data to produce digital combined FM audio data which it may output via a digital interface $250_1$ (e.g., such as 4-wire Inter-IC sound (I2S) bus) to a data circuit (e.g., to a host processor, digital logic, other circuitry, or any combination thereof). Alternatively or additionally, the terminal FM RF tuner circuit $202b_1$ may be optionally configured to output the combined FM IF data via digital interface $250_1$ to an external data circuit (e.g., external demodulator).

In the illustrated embodiment of FIG. 2, the FM DSP 226 of each RF tuner circuit $202_1$-$202_{N-1}$ may also be configured to demodulate its own individual FM IF data to produce individual tuner FM audio data, in which case each of initial and intermediate FM RF tuner circuits $202b_1$-$202_{N-1}$ may be configured to output its individual tuner FM audio data alone via its respective IC communication link transmitter 224 to the next downstream tuner circuit 202 across a segment of IC communication link 1 280. Similarly, the FM DSP $226_1$ of terminal FM RF tuner circuit $202b_1$ may be configured to pass on individual FM audio data received from other intermediate RF tuner circuits 202 to the data circuit via digital interface $250_1$ and/or to demodulate its own individual FM IF data to produce its own individual tuner FM audio data which it may then output via digital interface $250_1$ to a data circuit.

In one embodiment, this configuration allows an external audio system connected only to terminal RF tuner circuit $202b_1$ via digital interface $250_1$ to receive FM demodulated audio indirectly from any other single RF tuner circuit $202b$. For example, sometimes one or more of the tuner circuits $202b$ may not be participating in the tuning of an FM station (e.g., rather it may be scanning DAB and or doing something else). In such a case, a demodulated FM audio stream may be passed from an actively-tuning FM tuner circuit $202b$ straight through to terminal RF tuner circuit $202b_1$ so it can selected by a user for output to an external audio system, e.g., for eventual playback over external amplifier and speakers. In one embodiment, a user may select one or more of the demodulated FM audio streams from the FM tuner circuits $202b$ to be passed separately out of digital interface $250_1$ and these selected audio streams may be sent on different channels at the same time as FM IF data or HD IF data. In an alternate embodiment, each intermediate FM RF tuner circuit $202b$ may also be optionally configured such that its corresponding FM DSP 226 may output its own individual FM audio data and/or combined FM audio data directly to a data circuit via its own optional digital interface 250 as shown.

Still referring to the exemplary embodiment of FIG. 2, the HD/DAB DSP 236 of each RF tuner circuit $202_2$-$202_N$ may also be configured to demodulate its own individual HD/DAB IF data to produce individual tuner HD/DAB audio data, in which case each of initial and intermediate HD/DAB RF tuner circuits $202a_1$-$202_{N-1}$ may be configured to output its individual tuner HD/DAB audio data alone via its respective IC communication link transmitter 224 to the next downstream tuner circuit 202 across a segment of IC communication link 1 290. Similarly, the HD/DAB DSP $236_N$ of terminal HD/DAB RF tuner circuit $202a_N$ may be configured to pass on individual HD/DAB IF data and/or HD/DAB audio data received from other intermediate HD/DAB RF tuner circuits 202a to the data circuit via digital interface $240_N$ and/or to demodulate its own individual HD/DAB IF data to produce its own individual tuner HD/DAB audio data which it may then output via digital interface $240_N$ (e.g., such as 4-wire Inter-IC sound (I2S) bus) to a data circuit (e.g., to a host processor, digital logic, other circuitry, or any combination thereof). Alternatively or additionally, the terminal HD/DAB RF tuner circuit $202a_N$ may be optionally configured to output the combined HD/DAB IF data and/or combined HD/DAB audio data via digital interface $240_N$ to an external data circuit (e.g., external demodulator). In another alternate embodiment, each intermediate HD/DAB RF tuner circuit 202a may also be optionally configured such that its corresponding HD/DAB DSP 236 may output at least one of its own individual HD/DAB IF data, combined HD/DAB IF data, individual HD/DAB audio data, and/or combined HD/DAB audio data directly to a data circuit via its own optional digital interface 240 as shown.

Alternatively or additionally, a given FM DSP 226 of each given intermediate FM RF tuner circuit $202b_2$-$202_{N-1}$ may also be configured to combine the FM IF data provided from the ADC 212 of its own respective tuner circuit 202 with FM IF data received from a DSP 226 of another upstream tuner circuit 202 across one or more segments of inter-chip communications link 280 to produce combined FM IF data, which the given DSP 226 may then demodulate to produce combined FM audio data which it may then send out across inter-chip communications link 280 to the next downstream FM RF tuner circuit 202b in the direction of the arrows shown in FIG. 2. Since initial FM RF tuner circuit $202b_N$ of FIG. 2 has no DSP 226, ADC $212_N$ of tuner circuit $202_N$ may provide its IF FM data across IC communication link 280 to DSP $212_{N-1}$ of tuner circuit $202_{N-1}$ where IF FM data of tuner circuit $202_N$ may be combined with IF FM data of tuner circuit $202_{N-1}$ and then demodulated and provided as combined FM audio data to the DSP 212 of the next downstream FM RF tuner circuit 202b across IC communication link 280.

In FIG. 2, final FM audio signal selection may be performed by DSP $226_1$ of terminal FM RF tuner circuit $202b_1$ as shown to produce demodulated FM audio data at digital interface $250_1$, which may be produced from combined IF data prior to demodulation by DSP $226_1$. Further, as previously described, each intermediate FM RF tuner circuit 202b may also be optionally configured such that its corresponding FM DSP 226 may additionally or alternatively output its own FM IF data, its own demodulated FM audio data, FM IF data received from one or more other upstream FM tuner circuits 202, and/or demodulated FM audio data received from one or more other upstream FM tuner circuits 202 directly to a data circuit via its own optional digital interface 250 as shown.

Similarly, a given HD/DAB DSP 236 of each given intermediate HD/DAB RF tuner circuit $202a_2$-$202_{N-1}$ may also be configured to combine the HD/DAB IF data provided from the ADC 212 of its own respective tuner circuit 202 with HD/DAB IF data received from a DSP 236 of another upstream tuner circuit 202 across one or more segments of inter-chip communications link 290 to produce combined HD/DAB IF data, which the given DSP 236 may then demodulate to produce combined HD/DAB audio data which it may then send out across inter-chip communications link 290 to the next downstream HD/DAB RF tuner circuit 202a in the direction of the arrows shown in FIG. 2. Since initial HD/DAB RF tuner circuit $202a_1$ of FIG. 2 has no DSP 236, ADC $212_1$ of tuner circuit $202_N$ may provide its IF HD/DAB data across IC communication link 290 to DSP $212_2$ of tuner circuit $202_2$ where IF HD/DAB data of tuner circuit $202_1$ may be combined with IF HD/DAB data of tuner circuit $202_2$ and then demodulated and provided as combined HD/DAB audio data to the DSP 212 of the next downstream HD/DAB RF tuner circuit 202a across IC communication link 290.

In FIG. 2, final HD/DAB audio signal combining may be performed in one embodiment by DSP $236_N$ of terminal HD/DAB RF tuner circuit $202a_N$ as shown to produce combined demodulated HD/DAB audio data at digital interface $240_N$. Further, as previously described, each intermediate HD/DAB RF tuner circuit 202a may also be optionally configured such that its corresponding HD/DAB DSP 236 may additionally or alternatively output its own HD/DAB IF data, HD/DAB IF data received from one or more other upstream HD/DAB RF tuner circuits 202a, its own demodulated HD/DAB audio data, and/or demodulated audio data received from one or more other upstream HD/DAB RF tuner circuits 202a directly to a data circuit via its own optional digital interface 240 as shown. The exemplary system architecture of FIG. 2 advantageously allows for more optimal use of chip resources (e.g., MIPS, power, pins, etc.) by allowing the performance of final signal combining for each of broadcast analog FM band signals and digital FM band HD/DAB signals in separate RF tuner circuit chips $202_1$ and $202_N$, respectively. Further, since the digitized data may be transmitted between RF tuner circuits 202 on at least two separate IC communication links (e.g., HD/DAB data on IC communication link 290 and FM data and audio data on IC communication link 280), each of the separate IC communication links may run at a reduced speed. Additionally, the use of multiple separate IC communication links allows IF signal data from different signal types to be transmitted asynchronously.

Figure 3:
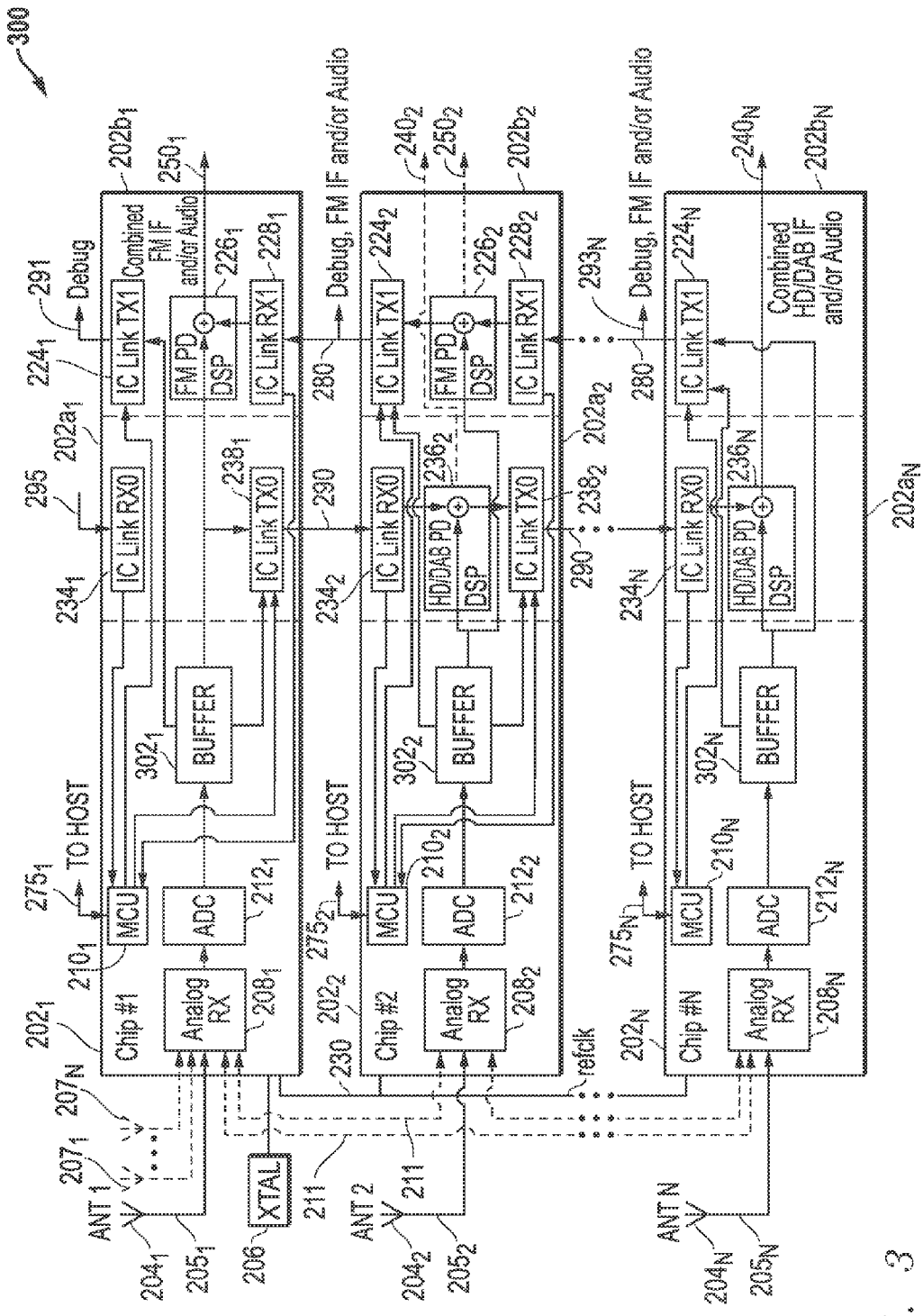
FIG. 3 illustrates a block diagram of a multiple-signal type antenna diversity system configured according to one exemplary embodiment of the disclosed systems and methods.

Although FIGS. 2 and 3 illustrate embodiments of RF antenna diversity systems having tuner circuits 202 configured to receive FM and HD/DAB signal types, RF antenna diversity systems are also possible that are provided with tuner circuitry 202 configured to receive any other combination of two or more RF signal types including, but not limited to, two or more signal types selected from broadcast analog AM, broadcast digital DAB, broadcast digital L-Band, broadcast Digital Radio Mondiale (DRM), broadcast Compatible AM-Digital (CAM-D), etc. Thus, it will be understood that in various embodiments any one or more of off chip data links (e.g., 293 and 297), as well as any one or more of digital interfaces (e.g., 250 and 240), may output to external circuitry at least any one or more of the following types of data corresponding to a RF signal type of the IC communication link to which the given off chip data link or digital interface is coupled: 1) IF data from any individual one of RF tuner circuits 202, 2) IF data combined from any two or more of RF tuner circuits 202, 3) audio from any individual one of RF tuner circuits 202, 4) audio data combined from any two or more of RF tuner circuits 202. Moreover, it is also possible that any one or more of off chip data links (e.g., 293 and 297) may carry multiple types of data at the same time.

In one embodiment, an MCU 210 of the RF tuner circuits 202 of an RF antenna diversity system may use the above-described capabilities of at least two IC communication links 280 and 290 to implement a variety of operating modes for each of two or more signal types of the RF antenna diversity system (e.g., such as broadcast analog FM band signals and broadcast digital FM band HD/DAB signals of RF tuner circuits 202 of FIG. 2, and/or other alternative or additional signal types such as broadcast analog AM band, broadcast digital DAB/L-band signal, etc.) by controlling the respective DSPs corresponding to each signal type and each tuner circuit 202 of the system. Examples of such operating modes that may be implemented simultaneously and/or asynchronously for the multiple signal types of a given system disclosed herein include, but are not limited to, phase diversity mode, switching antenna mode, alternate frequency scan mode, etc. Further information on examples of some types of such operating modes may be found in U.S. Pat. No. 8,548,031; U.S. Pat. No. 8,331,887; and United States Patent Application Publication No. 2011/0158298; each of which is incorporated herein by reference in its entirety.

For example, in a phase diversity mode, a DSP of a terminal RF tuner circuit of each given one of the multiple signal types of a multi-signal type RF antenna diversity system may synchronize DSP frames corresponding to the given signal type (including the digitized version of the IF signal and signal data within an IC communication link frame received by the terminal RF tuner circuit across an IC communication link from upstream tuner circuit/s), and perform maximal ratio combining or other similar digital signal processing techniques to coherently combine the IF signal from the terminal tuner circuit and the upstream tuner circuits, and then provide the combined signal corresponding to the given signal type through a digital interface to a host data circuit. As described above in relation to FIG. 2, one or more given intermediate tuner circuits may be optionally configured to perform similar digital signal processing techniques to coherently combine the IF signal from the given intermediate tuner circuit and any upstream tuner circuits, and then provide the combined signal corresponding to the given signal type through its own intermediate tuner digital interface to a host data circuit. This operating mode may be performed simultaneously and/or asynchronously for each given RF signal type of the RF antenna diversity system.

As another example, in a switching antenna mode each of the RF tuner circuits of a multi-signal type RF antenna diversity system may operate independently from each other to receive each RF signal type via its own separate antenna/s which may be spaced apart from and/or oriented differently from antennas of the other RF tuner circuits of the RF antenna diversity system. More particularly, in the switching antenna mode, a terminal RF tuner circuit or an intermediate tuner circuit may be operated to independently improve signal reception for each RF signal type (e.g., analog FM and AM bands (including digital HD Radio or CAM-D in those bands), L band or band III (DAB), DRM, etc.) of the RF tuner circuit by continuously monitoring the signal quality metrics calculated for each given RF signal type from the digitized version of the IF signal of the given tuner and its antenna as compared to the IF signal metrics of other upstream RF tuners and their antennas for the given RF signal type as received across an IC communication link. Examples of such signal quality metrics include, but are not limited to, signal-to-noise ratio (SNR), receive signal strength indicator (RSSI), other quality metrics, etc.). In this operating mode, a terminal or intermediate tuner DSP for the given signal type may be configured to select between the signals of the multiple system antennas based on the signal metrics and to provide the strongest signal for the given RF signal type from among the different system antennas through its tuner digital interface as digital audio data to a host data circuit. This operating mode may also be performed simultaneously and/or asynchronously for each given RF signal type of the RF antenna diversity system.

An alternate frequency scan operating mode may also be implemented for each RF signal type of a multi-signal type antenna diversity system. For example, a host data circuit may control the diversity system to continue outputting the digital demodulated audio data for a given one of the multiple RF signal types from a selected one of the multiple RF tuner circuits having the current strongest signal (e.g., highest received signal strength) of all RF tuner circuits, while at the same time controlling the other RF tuner circuits to tune to the same content in another frequency of the same RF signal type to continuously check the associated signal quality metrics. Depending on the results of this continuous comparison, the host data circuit may decide to control the multiple RF tuner circuits of the antenna diversity system to operate in phase diversity mode or switched antenna diversity mode for the given RF signal type at the new frequency, e.g., based on a determination of which operating mode (i.e., phase diversity mode or switched antenna diversity mode) will yield demodulated audio data having the most desired characteristics, e.g., such as highest signal to noise ratio (SNR) or other measured characteristic. When performing alternate-frequency scan, it is possible to have different tuner circuits working in entirely different frequency bands, such as FM vs. DAB, and/or other different frequency bands received by different types of antennas 204 and $207_1$ to $207_N$ of each RF tuner circuit chip 202.

FIG. 3 illustrates another exemplary embodiment of a dual-signal type radio frequency (RF) antenna diversity system 300 having two or more RF tuner circuits $202_1$-$202_N$ that are configured similarly to the embodiment of FIG. 2. However, in FIG. 3 the semiconductor chip of each given RF tuner circuit 202 also includes a respective internal buffer 302 that is coupled between the ADC 212 and one or more IC communication link transmitter circuits 224 and/or 234 of the given RF tuner circuit as shown, it being understood that any given buffer 302 may only be coupled to one of IC communication link transmitter circuits 224 or 234. Such an internal buffer 302 may be, for example, a separate RAM buffer memory or may be the DSP input RAM buffer (as opposed to another DSP RAM buffer that contains combined/processed data written by the DSP). This allows, for example, an RF tuner circuit 202 to optionally send the raw "uncombined" via IF data IC communication link transmitter circuits 224 and/or 234, e.g., if necessary for debug observation. This type of "unprocessed" transfer of data taken from DSP input buffers may also be used in one embodiment to send audio data via IC communication link transmitter circuits 224 and/or 234 between RF tuner circuits 202, with data being copied from RF tuner circuit 202 to another RF tuner circuit 202 with no DSP processing.

Specifically in the embodiment of FIG. 3, the internal buffer 302 of each RF tuner circuit chip 202 is configured to receive and store IF debug data, which may then be captured or otherwise retrieved by an external data logger via a separate data channel across IC communication link 0 290 and/or IC communication link 1 280. Advantageously, retrieving IF debug data and other debug data via the same IC communication links 290 and/or 280 from one or more data buffers 302 rather than directly from the DSP 226 or 236 via IC communication link 290 or 280 allows non-intrusive data logging of internal buffers 302 to retrieve or otherwise observe the debug data or any other internal buffer data of any given RF tuner circuit 202 from the same IC communication links used for phase diversity without disturbing, disrupting or interfering with normal phase diversity chip operation and IC communication link data flow between different RF tuner circuits 202. Moreover, presence of data buffers 302 allows capture or retrieval of data from any given RF tuner circuit 202 without experiencing adverse effects of asynchronous IF data rates between the multiple signal types (e.g., broadcast analog FM band signal type having data bandwidth of about 2.408 kHz and broadcast digital FM band HD/DAB signal type having data bandwidth of about 3.72 kHz).

Although FIGS. 2 and 3 illustrate embodiments of a multiple-signal type antenna diversity system provided in a daisy-chained or "cascade" topology configuration, it will be understood that other topologies are possible. For example, a multiple-signal type antenna diversity system may be provided in another embodiment in a star configuration having a central terminal combining RF tuner circuit chip 202 that is directly fed via any suitable protocol of IC communication links from several other RF tuner circuit chips 202. In a further embodiment, a central terminal combining chip may provided that is not be a RF tuner circuit chip 202. Further possible are several small star-connected subsystems, that are themselves connected together in a star topology or a daisy-chained topology.

Figure 4:
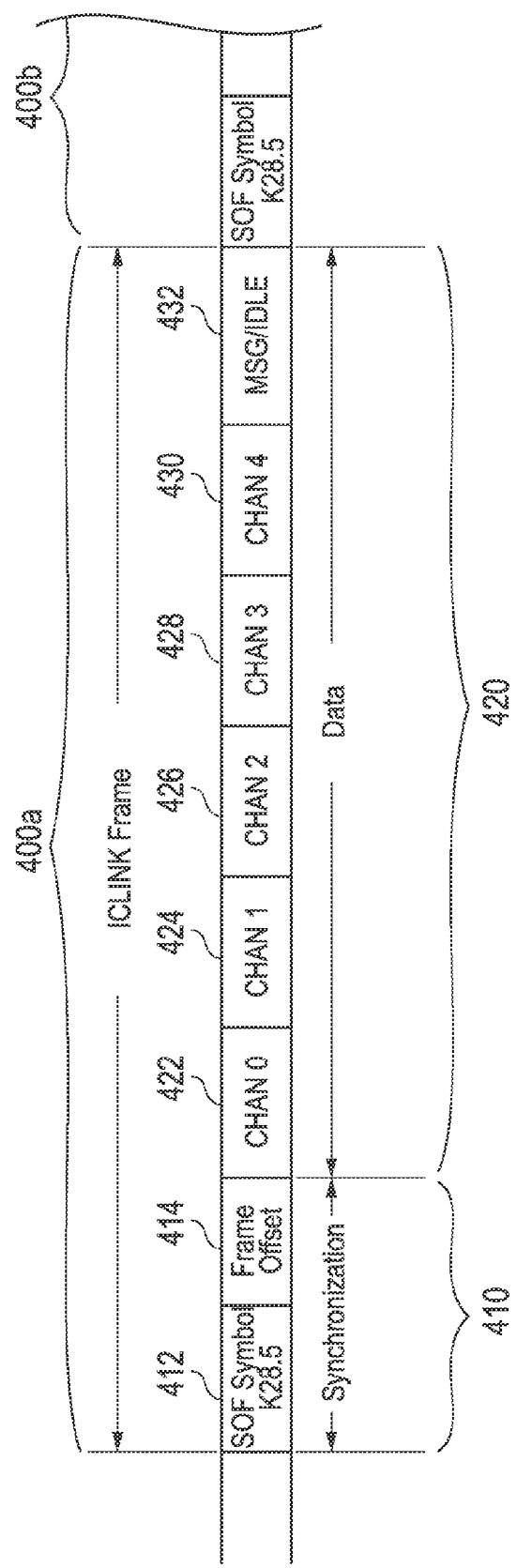
FIG. 4 illustrates an IC communication link frame format according to one exemplary embodiment of the disclosed circuitry and methods.

FIG. 4 is a diagram of one exemplary embodiment of an IC communication link (ICLINK) frame format 400a that may be used to transmit data across any one of multiple IC communication links (e.g., such as IC communication link 0 290 or IC communication link 1 280 of FIGS. 2 and 3) between RF tuner circuits of an antenna diversity system, such as RF tuner circuits 202 of system 200 of FIG. 2 or system 300 of FIG. 3. In this regard, data may be communicated using IC communication link frame format 400a between RF tuner circuits of an antenna diversity system and/or between one or more RF tuner circuits and one or more external devices (e.g., such as host data circuit, external data logger, etc.). In one embodiment, IC communication link frame 400a may have a programmable width configured to carry a number of bits, and includes a frame synchronization field 410 and a data field 420. In FIG. 4, IC communication link frame 400a is shown as it may be transmitted adjacent to the beginning of a subsequent frame 400b that may employ the same frame format as 400a.

Still referring to the embodiment of FIG. 4, frame synchronization field 410 of ICLINK frame 400a may include two 10-bit symbols, including a start of frame (SOF) symbol byte 412 and a frame offset count (or DSP count offset) symbol byte 414. In an embodiment where the IC communication link frame 400a includes data samples encoded using 8-bit/10-bit encoding, the start symbol 412 may be a frame start synchronization symbol called a K28.5 comma that is sent at the start of every DSP frame. Further information on example use of frame start synchronization, DSP count offset symbols and frame communications may be found in U.S. Pat. No. 8,548,031; U.S. Pat. No. 8,331,887; and United States Patent Application Publication No. 2011/0158298; each of which is incorporated herein by reference in its entirety.

In the practice of the disclosed systems and methods, a data field of an IC communication link frame may include multiple data channels which may be independently enabled. These data channels may include, for example, any combination of synchronous streaming data channels, synchronous/asynchronous streaming data channels, and/or non-streaming/packetized messaging data channels. For example in the exemplary embodiment of FIG. 4, data field 420 of IC communication link frame 420 includes six data channels 422, 424, 426, 428, 430 and 432. For each of these data channels, idle bytes may be sent when no data is available.

In one embodiment, each of data channels 422, 424, 426 may be synchronous streaming data channels having a rate that is synchronous with the ICLINK frame rate. Each of data channels 422, 424, 426 may have a programmable word width (e.g., 16, 20, 24 . . . 48 bits), and in one embodiment may be used for transmitting HD/DAB IF data, FM IF data, HD/DAB in-phase/quadrature (IQ) data, FM IQ data, and/or Audio data across IC communication links 280 and 290. For example, during some operating modes one or more of data channels 422, 424, 426 may include in-phase data and quadrature data. When operating in a phase diversity mode, one or more data channels 422, 424, 426 may carry the DSP IF data stream, or may carry other types of DSP data in other operating modes.

In one embodiment, at least one of data channels 422, 424, 426 may carry status information, such as signal metrics or other data. For example, in a phase diversity mode and in a switching antenna mode, at least one of data channels 422, 424, 426 may carry status information in the form of signal metrics for IF data carried by another one of data channels 422, 424, 426. In an alternate frequency scan mode, at least one of data channels 422, 424, 426 may carry other types of data, such as the demodulated audio data, which may be provided, for example, from an initial or terminal tuner circuit 202 to a host data circuit through a terminal tuner circuit 202 for a given received signal type.

In one embodiment, each of data channels 428 and 430 may be streaming data channels that are capable of communicating data in either of a synchronous mode that is similar to the operating mode of data channels 422, 424, 426, or in an asynchronous mode, e.g., that has a 2 symbol overhead per channel. In such an embodiment, each of data channels 428 and 430 may be utilized in a debug mode to access or snoop on any internal data buffer (e.g., such as a buffer 302 of FIG. 3), even if it is not synchronous to the IC Link transmitter's frame rate.

In another embodiment, data channel 432 may be employed as a non-streaming/packetized messaging channel that may be utilized to send a single data packet (e.g., having a packet length that is a multiple of 32 bit words) over multiple frames 400 using any available bandwidth. Such a non-streaming/packetized messaging channel may be utilized, for example, to send timing-critical messages between MCUs 210 of different RF tuner circuit chips 202 of the system of FIG. 2 or 3. For example, such message data may include automatic gain control (AGC) message data sent from one RF tuner circuit 202 to another RF tuner circuit 202, e.g., such as from an initial and/or intermediate tuner circuit to a terminal tuner circuit for one of the dual RF signal types of system 200 instructing the terminal tuner circuit to reduce or increase gain of a combined audio data sent out across digital interface 240 or 250 by the RF tuner circuit receiving the AGC message. Advantageously, such message data may be sent both ways between separate RF tuner circuits 202, e.g., using a messaging channel 432 to transmit messages across each of the two respective IC communication links 280 and 290 in opposite directions. In another example, such a non-streaming/packetized messaging channel of data channel 432 may utilized to send a large debug data buffer from memory of a DSP 226 or 236 to an external debugger circuit.

In one exemplary embodiment, data channel 432 may be a relatively low bandwidth control channel or field that carries micro-control unit (MCU) control packets. The start and end of the MCU control packets can occur within any IC communication link frame 400. In one example, data channel 432 may carry a micro-control unit (MCU) byte 0/idle byte 322 and MCU bytes/idle bytes, which may carry control data to control operation of a receiving tuner circuit. For example, control data may be sent within data channel 432 from an initial or intermediate tuner circuit 202 to a terminal circuit of a given received signal type to control operation of the terminal tuner circuit 202. The data channel 432 may be synchronized to the IC communication link frame, but the information contained in the data channel 432 may be asynchronous to the information contained in data channels 422, 424, 426. Data channel 432 may be included within an IC communication link frame 400 after data streams of channels 422, 424, 426 are sent, and control data may be sent over multiple IC communication link frames 400.

It will be understood that to combine signals and/or to compare signal strengths effectively within the DSP of a given RF tuner circuit 202, synchronization of the DSP frame 400 of a first tuner circuit 202 to that of a second tuner circuit 202 is important. In one embodiment, an IC communication link receiver 228 or 234 of a first RF tuner 202 may synchronize a DSP frame counter to a second tuner's DSP frame counter by acting upon the frame synchronization fields which it receives from the second tuner's respective IC communication link transmitter 224 or 238. It will be understood that a DSP frame 400 may be any integer number of clock cycles in length. The period of the clock may be the same length as each bit period of the data that is being sent across a given IC communication link.

Figure 5:
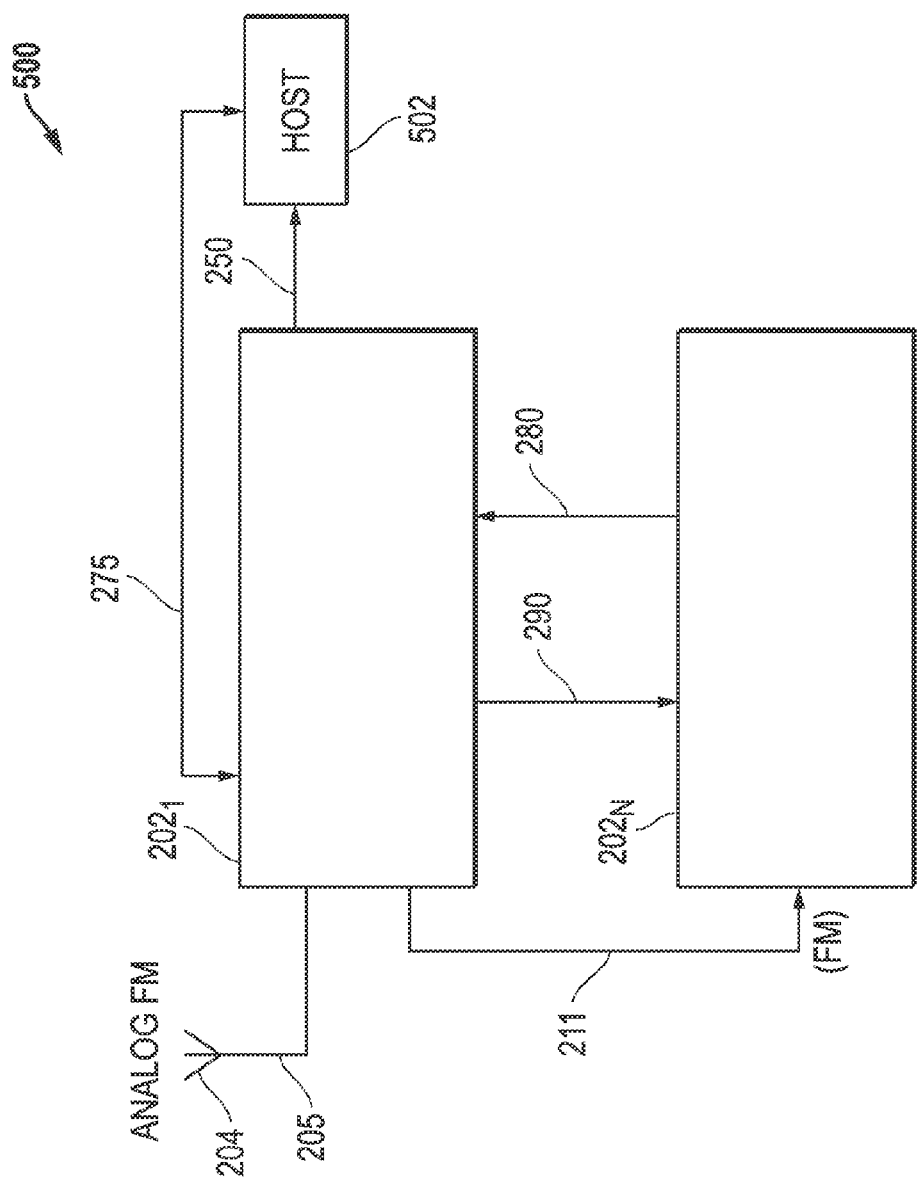
FIG. 5 illustrates a block diagram of a multiple-signal type antenna diversity system configured according to one exemplary embodiment of the disclosed systems and methods.
Figure 6:
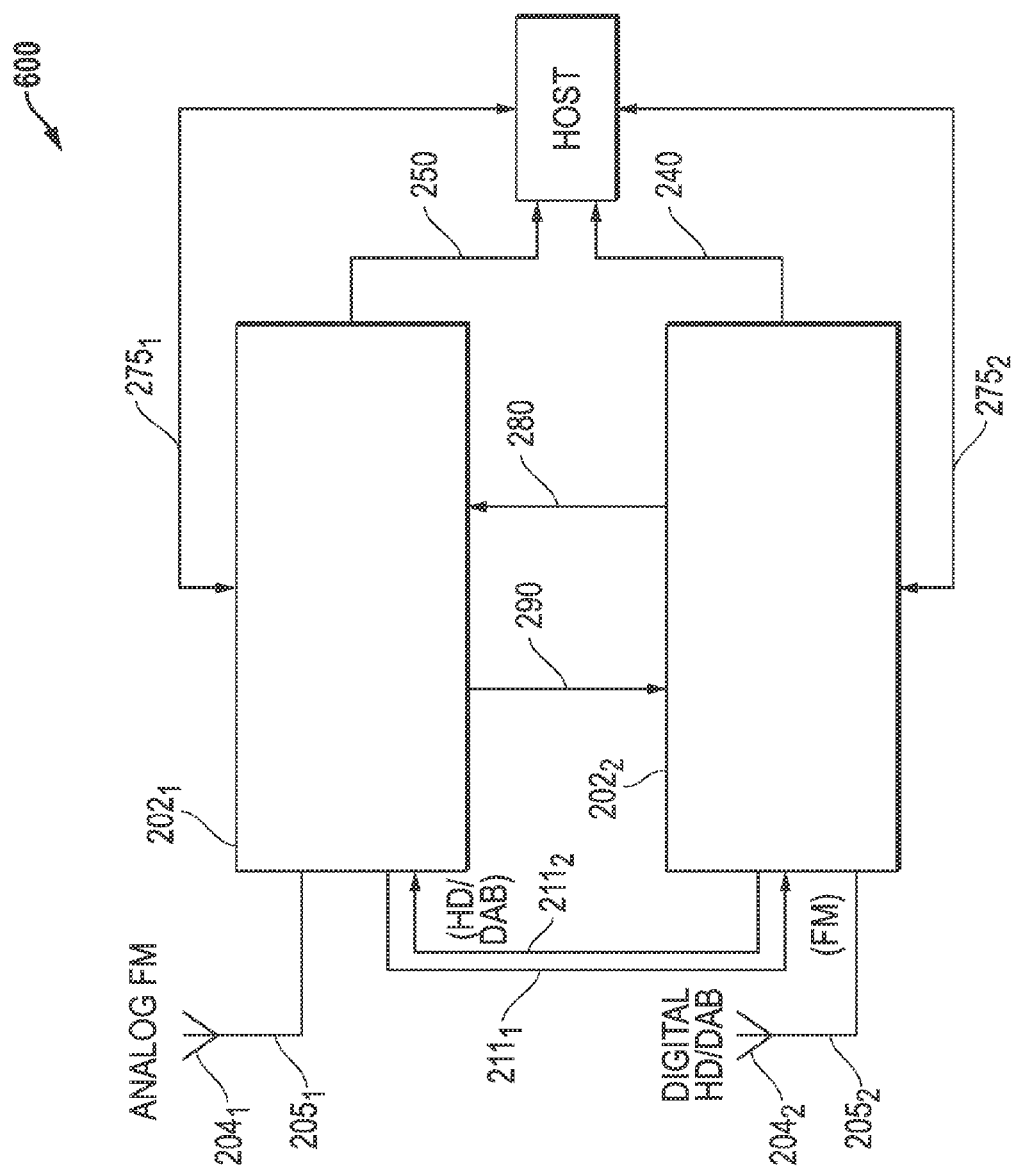
FIG. 6 illustrates a block diagram of a multiple-signal type antenna diversity system configured according to one exemplary embodiment of the disclosed systems and methods.

FIGS. 5 and 6 illustrate two respective exemplary embodiments of antenna diversity system architectures 500 and 600 that may be implemented using the disclosed systems and methods. In these illustrated embodiments each of systems 500 and 600 may be configured with similar internal circuitry and IC communication links 280 and 290 as illustrated and described in relation to FIGS. 2 and 3. It will be understood that although each of systems 500 and 600 are illustrated as having two interconnected RF tuner circuit chips $202_1$ and $202_2$, that it is alternatively possible that similar architectures may be implemented for an antenna diversity system that are scaled up to have more than two RF tuner circuits similarly interconnected by multiple feed-through paths and multiple IC communication links that enable bi-directional communication between the RF tuner circuits.

In FIG. 5, only analog receiver circuitry of RF tuner circuit $202_1$ is directly coupled to its own antenna 204, and in this case is configured to receive broadcast analog FM band signals 205 from antenna 204. As shown, analog receiver circuitry of RF tuner circuit $202_2$ is not directly coupled to an antenna, but is coupled to receive broadcast analog FM band signals via a RF signal feed-through path 211 from analog receiver circuitry of RF tuner circuit $202_1$. Thus, in this embodiment either or both of RF tuner circuits $202_1$ and $202_2$ may mix, digitize and/or demodulate analog FM band signals received by antenna 204, and FM IF data or demodulated FM audio data may be provided from RF tuner circuit $202_2$ across IC communication link 280 to RF tuner circuit $202_1$ in a manner as previously described. In either case, demodulated audio data from either RF tuner circuit $202_1$ or $202_2$ may be provided to a host system 502 across digital interface 250. As further shown, a host processing device of host system 502 may be coupled to provide control signals 275 to a MCU of RF tuner circuit $202_1$ to control tuning operations of each of RF tuner circuits $202_1$ and $202_2$, using IC communication links 280 and 290 to communicate control and status data between MCUs of RF tuner circuits $202_1$ and $202_2$.

In FIG. 6, analog receiver circuitry of each of RF tuner circuits $202_1$ and $202_2$ is directly coupled to its own respective antenna $204_1$ or $204_2$, such that the analog receiver circuitry of RF tuner circuit $202_1$ is configured to receive broadcast analog FM band signals $205_1$ from antenna $204_1$ and such that the analog receiver circuitry of RF tuner circuit $202_2$ is configured to receive broadcast digital FM band HD/DAB signals $205_2$ from antenna $204_2$. In this exemplary embodiment, analog receiver circuitry of RF tuner circuit $202_2$ is coupled to receive broadcast analog FM band signals via RF signal feed-through path $211_1$ from receiver circuitry of RF tuner circuit $202_1$, and analog receiver circuitry of RF tuner circuit $202_1$ is coupled to receive broadcast digital FM band HD/DAB signals via RF signal feed-through path $211_2$ from receiver circuitry of RF tuner circuit $202_2$. Thus, in this embodiment RF tuner circuit $202_2$ may mix, digitize and/or demodulate analog FM band signals received by antenna $204_1$ and RF tuner circuit $202_1$ may mix, digitize and/or demodulate digital FM band HD/DAB signals received by antenna $204_2$, with demodulated audio data from RF tuner circuit $202_1$ provided to host system 502 across digital interface 250 and with demodulated audio data from RF tuner circuit $202_2$ provided to host system 502 across digital interface 240. As further shown, a processing device of host system 502 may be coupled to provide respective control signals $275_1$ and $275_2$ to control tuning operations of each of RF tuner circuits $202_1$ and $202_2$.

It will be understood that one or more of the tasks, functions, or methodologies described herein (e.g., including those described for MCUs 210 and/or host data circuit 502) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:
1. An antenna diversity system, comprising:
at least two radio frequency (RF) tuner circuits coupled together by at least a first segment of a first inter-chip (IC) communication link and at least a first segment of a second IC communication link, the two RF tuner circuits being configured to simultaneously communicate at least one of digital streaming data, non-streaming digital packetized data, or a combination thereof simultaneously across the first segment of the first IC communication link and across the first segment of the second IC communication link;
  where each given one of the two RF tuner circuits has a RF input that is configured to receive RF signals of a RF spectrum and at least one digital output that is configured to produce at least one digital output signal that is based at least in part on the RF signals received by the RF input of the given RF tuner circuit, digital streaming data received from the other RF tuner circuit across at least one of the first segment of the first IC communication link or the first segment of the second IC communication link, or a combination thereof.

2. The system of claim 1, where a first one of the two RF tuner circuits is configured to transmit at least one of digital streaming data, non-streaming digital packetized data, or a combination thereof to a second one of the two RF tuner circuits simultaneously across each of the first segment of the first IC communication link and the first segment of the second IC communication link at the same time.

3. The system of claim 1, where a first one of the two RF tuner circuits is configured to transmit at least one of digital streaming data, non-streaming digital packetized data, or a combination thereof to a second one of the two RF tuner circuits across the first segment of the first IC communication link; and where the second one of the two RF tuner circuits is configured to simultaneously transmit at least one of digital streaming data, non-streaming digital packetized data, or a combination thereof to the first one of the two RF tuner circuits across the first segment of the second IC communication link.

4. The system of claim 1, where the RF signals received by the RF input of each of the RF tuner circuits comprise at least a first type RF signal and a second type RF signal that is different than the first type RF signal; and where the two RF tuner circuits are configured to communicate digital streaming data related to the first type RF signal across the first segment of the first IC communication link simultaneously and asynchronously with communicating digital streaming data related to the second type RF signal across the first segment of the second IC communication link.

5. The system of claim 4, where each given one of the two RF tuner circuits further comprises at least one processing device that is configured to control operation of the given RF tuner circuit; and where the respective processing devices of the RF tuner circuits are configured to selectably implement a phase diversity operating mode in response to one or more control signals received from a host processing device by simultaneously:
  controlling a first one of the two RF tuner circuits to combine digital data related to the first type RF signal with the digital streaming data related to the first type RF signal received across the first segment of the first IC communication link to produce a first digital output signal to a host processing device from the first RF tuner; and
  controlling a second one of the two RF tuner circuits to combine digital data related to the second type RF signal with the digital streaming data related to the second type RF signal received across the first segment of the second IC communication link to produce a second digital output signal to a host processing device from the second RF tuner;
  where the first RF tuner circuit is controlled to combine digital data related to the first type RF signal with the digital streaming data related to the first type RF signal in a manner that is asynchronous to the combination by the second RF tuner circuit of the digital data related to the second type RF signal with the digital streaming data related to the second type RF signal.

6. The system of claim 4, where each given one of the two RF tuner circuits further comprises at least one processing device that is configured to control operation of the given RF tuner circuit; and where the respective processing devices of the RF tuner circuits are configured to respond to one or more control signals received from a host processing device by selectably implementing at least one of an alternate frequency scan mode, a phase diversity operating mode, a switched antenna diversity mode, or a combination thereof.

7. The system of claim 4, where each given one of the two RF tuner circuits further comprises at least one processing device configured to control operation of the given RF tuner circuit; and where the two RF tuner circuits are configured to communicate non-streaming digital packetized message and/or control data between the processing devices of the two RF tuner circuits across at least one of the first segment of the first IC communication link or the first segment of the second IC communication link simultaneously while communicating at least one of the digital streaming data related to the first type RF signal across the first segment of the first IC communication link between the two RF tuner circuits or digital streaming data related to the second type RF signal across the first segment of the second IC communication link between the two RF tuner circuits.

8. The system of claim 1, where each of the two RF tuner circuits comprises an internal data buffer; and where debug information stored on the internal data buffer of each of the two RF tuner circuits is accessible via digital streaming data transmitted across at least one of the first segment of the first IC communication link or the first segment of the second IC communication link simultaneously and asynchronously with digital streaming data related to the first or second type RF signal that is transmitted across the same first segment of the first IC communication link or the first segment of the second IC communication link.

9. The system of claim 1, further comprising a RF feed-through signal path coupled between the two RF tuner circuits; and where the RF input of at least one of the two RF tuner circuits is configured to be selectably coupled to receive the RF signals of the RF spectrum either directly from a RF antenna or from the other RF tuner circuit through the RF feed-through path.

10. The system of claim 1, where the system is configured to be scalable to at least one additional RF tuner circuit by coupling at least a third RF tuner circuit to one of the two RF tuner circuits by a second segment of the first IC communication link and a second segment of the second IC communication link to allow each of the two RF tuner circuits to communicate at least one of digital streaming data, non-streaming digital packetized data, or a combination thereof simultaneously with the third RF tuner circuit across the second segment of the first IC communication link and across the second segment of the second IC communication link; and
  where the third RF tuner circuit has a RF input that is configured to receive RF signals of a RF spectrum and at least one digital output that is configured to produce at least one digital output signal to a host processing device that is based at least in part on the RF signals received by the RF input, digital streaming data received from the other two RF tuner circuits across one or both of the second segment of the first inter-chip (IC) communication link, the second segment of the second IC communication link, or a combination thereof.

11. The system of claim 1, where each of the two RF tuner circuits is a separate semiconductor chip that comprises a IC transmitter circuit and a IC receiver circuit; where the first segment of the first IC communication link extends between and couples the two RF tuner circuits; where the first segment of the second IC communication link extends between and couples the two RF tuner circuits; where the first segment of the first IC communication link is separate and different from the first segment of the second IC communication link; where the first segment of the first IC communication link is coupled between a first IC transmitter circuit of one of the two RF tuner circuits and a first IC receiver circuit of one of the two RF tuner circuits; where the first segment of the second IC communication link is coupled between a second IC transmitter circuit of one of the two RF tuner circuits and a second IC receiver circuit of one of the two RF tuner circuits; and where the first IC transmitter circuit is different than the second IC transmitter circuit and where the first IC receiver circuit is different than the second IC receiver circuit.

12. The system of claim 1, where each of the two RF tuner circuits is a separate semiconductor chip from the other RF tuner circuit; where a first one of the two RF tuner circuits comprises a first IC transmitter circuit and a first IC receiver circuit; where a second one of the two RF tuner circuits comprises a second IC transmitter circuit and a second IC receiver circuit; where the first segment of the first IC communication link is coupled to extend between the first IC transmitter circuit of the first RF tuner circuit and the second IC receiver circuit of the second RF tuner circuit; where the first segment of the second IC communication link is coupled to extend between the second IC transmitter circuit of the second IC tuner circuit and the first IC receiver circuit of the first IC tuner circuit; where the first one of the two RF tuner circuits is configured to transmit at least one of digital streaming data, non-streaming digital packetized data, or a combination thereof to a second one of the two RF tuner circuits across the first segment of the first IC communication link; and where the second one of the two RF tuner circuits is configured to simultaneously transmit at least one of digital streaming data, non-streaming digital packetized data, or a combination thereof to the first one of the two RF tuner circuits across the first segment of the second IC communication link.

13. The system of claim 1, where each of the two RF tuner circuits is a separate semiconductor chip; where the first segment of the first IC communication link is separate and different from the first segment of the second IC communication link; and where each of the first segment of the first segment of the first IC communication link and the first segment of the second IC communication link directly connects together the separate semiconductor chips of the two RF tuner circuits with no other semiconductor chip being connected in series between the two RF tuner circuits by the first segment of the first IC communication link and with no other semiconductor chip being connected in series between the two RF tuner circuits by the first segment of the second IC communication link.

14. A radio frequency (RF) tuner circuit, comprising:
a first digital signal processor (DSP) coupled to receive a digital signal related to a first type RF signal received by a RF input of the RF tuner circuit;
a first inter-chip (IC) receiver circuit configured to be coupled between the first DSP and a first segment of a first IC communication link, the first IC receiver link being configured to provide first type RF signal streaming data received from the first segment of the first IC communication link to the first DSP, and the first DSP being configured to produce at least one first digital output signal based at least in part on the digital signal that is derived from the received first type RF signal, the first type RF signal streaming data, or a combination thereof; and
a first IC transmitter circuit coupled to receive a second digital output signal that is based at least in part on a digital signal derived from a second type RF signal received by a RF input of the RF tuner circuit, a second type RF signal streaming data, or a combination thereof; and
where the first IC transmitter circuit is configured to be coupled to simultaneously transmit the second digital output signal to a first segment of a second IC communication link at the same time that the first IC receiver circuit is receiving the first type RF signal streaming data from the first segment of the first IC communication link and providing the received first type RF signal streaming data to the first DSP;
where the first type RF signal and the second type RF signal are different types of RF signals.

15. The RF tuner circuit of claim 14, further comprising at least one analog-to-digital converter (ADC) configured to convert the received first type RF signal and the received second type RF signal to the digital signal derived from the received first type RF signal and the digital signal derived from the received second type RF signal, respectively; where the first DSP is coupled to receive the digital signal derived from the received first type RF signal from the ADC; and where the first IC transmitter circuit is coupled to simultaneously receive the digital signal derived from the received second type RF signal from the ADC while the first DSP is receiving the digital signal derived from the received first type RF signal.

16. The RF tuner circuit of claim 14, where the first IC transmitter circuit is configured to be coupled to simultaneously transmit the second digital output signal to the first segment of the second IC communication link at a data rate that is asynchronous to a data rate at which the first IC receiver circuit is at the same time receiving the first type RF signal streaming data from the first segment of the first IC communication link and providing the received first type RF signal streaming data to the first DSP.

17. The RF tuner circuit of claim 14, further comprising an internal data buffer coupled between the first DSP and a source of the digital signal derived from the received first type RF signal, the internal data buffer configured to store debug data; where the internal data buffer is also coupled to at least one IC transmitter circuit that is configured to be coupled to provide the debug data from the internal data buffer to an external device across a segment of the first or second IC communication link while the first IC receiver link is receiving first type RF signal streaming data from the first segment of the first IC communication link and providing the received first type RF signal streaming data to the first DSP, and while the first IC transmitter circuit is simultaneously transmitting the second digital output signal to the first segment of the second IC communication link.

18. The RF tuner circuit of claim 14, where the RF tuner circuit is configured to be selectably coupled to an antenna to receive a RF spectrum containing at least one of the first type RF signal or a second first type RF signal from the antenna and not through any other RF tuner circuit; where the RF tuner circuit is further configured to be selectably coupled to provide the received RF spectrum to another RF tuner circuit through a first feed-through path; and where the RF tuner circuit is configured to be selectably coupled to receive a RF spectrum containing at least one of the first type RF signal or the second type RF signal from another RF tuner circuit through a second feed-through path rather than from the antenna.

19. The RF tuner circuit of claim 14, where the RF tuner circuit is a first tuner circuit that further comprises at least one first processing device separate from the first DSP and that is configured to control operation of the first RF tuner circuit, and the at least one first processing device being coupled to the first IC receiver circuit and the first IC transmitter circuit; where the first IC receiver circuit is configured to be coupled to receive first non-streaming packetized control and/or status message data across the first segment of the first IC communication link from a second processing device of a second RF tuner circuit, and to provide the received first control and/or status message data to the first processing device of the first RF tuner circuit; and where the first IC transmitter circuit is configured to be coupled to provide second non-streaming packetized control and/or status message data received from the first processing device across the first segment of the second IC communication link to the second processing device of the second RF tuner circuit.

20. A radio frequency (RF) tuner circuit, comprising:
a first digital signal processor (DSP) coupled to receive a digital signal related to a first type RF signal received by a RF input of the RF tuner circuit;
a first inter-chip (IC) receiver circuit configured to be coupled between the first DSP and a first segment of a first IC communication link, the first IC receiver link being configured to provide first type RF signal streaming data received from the first segment of the first IC communication link to the first DSP, and the first DSP being configured to produce at least one first digital output signal based at least in part on the digital signal that is derived from the received first type RF signal, the first type RF signal streaming data, or a combination thereof; and
a first IC transmitter circuit coupled to receive a second digital output signal that is based at least in part on a digital signal derived from a second type RF signal received by a RF input of the RF tuner circuit, a second type RF signal streaming data, or a combination thereof; and
where the first IC transmitter circuit is configured to be coupled to simultaneously transmit the second digital output signal to a first segment of a second IC communication link at the same time that the first IC receiver circuit is receiving the first type RF signal streaming data from the first segment of the first IC communication link and providing the received first type RF signal streaming data to the first DSP;
where the first type RF signal and the second type RF signal are different types of RF signals; and
where the RF tuner circuit further comprises:
a second DSP coupled to receive the digital signal derived from the received second type RF signal, the second DSP also being coupled to the first IC transmitter circuit and configured to transmit the second digital output signal to the first segment of the second IC communication link;
a second IC receiver circuit configured to be coupled between the second DSP and a second segment of a second IC communication link, the second IC receiver circuit being configured to provide second type RF signal streaming data received from the second segment of the second IC communication link to the second DSP, and the second DSP being configured to produce the second digital output signal as at least one second digital output signal that is based at least in part on the digital signal derived from the received second type RF signal, the second type RF signal streaming data, or a combination thereof; and
a second IC transmitter circuit coupled to receive at least one first digital output signal from the first DSP, and configured to be coupled to simultaneously transmit the at least one first digital output signal to a second segment of the first IC communication link at the same time that the second IC receiver circuit is receiving the second type RF signal streaming data from the second segment of the second IC communication link and providing the received second type RF signal streaming data to the second DSP.

21. A scalable antenna diversity system, comprising:
at least first and second radio frequency (RF) tuner circuits coupled together by a first segment of a first inter-chip (IC) communication link and a first segment of a second IC communication link;
where the first RF tuner circuit comprises a first digital signal processor (DSP) coupled to receive at least one of a digital signal derived from a first type RF signal received by a RF input of the first RF tuner circuit or first type RF signal streaming data received across the first segment of the first IC communication link from the second RF tuner circuit, where the first DSP of the first RF tuner circuit is configured to produce at least one first output signal based at least in part on the digital signal that is derived from the received first type RF signal, the first type RF signal streaming data received from the second RF tuner circuit across the first segment of the first IC communication link, or a combination thereof; and
where the second RF tuner circuit comprises a first DSP coupled to receive at least one of a digital signal derived from a second type RF signal or second type RF signal streaming data across the first segment of the second IC communication link from the first RF tuner circuit, where the first DSP of the second RF tuner circuit is configured to produce at least one second output signal based at least in part on the digital signal that is derived from the received second type RF signal, the second type RF signal streaming data received from the second RF tuner circuit across the first segment of the second IC communication link, or a combination thereof;
where the first type RF signal and the second type RF signal are different types of RF signals.

22. The system of claim 21, where at least the first RF tuner circuit further comprises an analog to digital converter (ADC) configured to produce a digital signal derived from a first type RF signal from an RF spectrum received by least one first antenna, the ADC of the first RF tuner circuit being coupled to provide the digital signal derived from the received first type RF signal to the first DSP; and where the second RF tuner circuit further comprises:
a second DSP coupled to provide first type RF signal streaming data to the first DSP of the first RF tuner circuit across the first segment of the first IC communication link; and
where the first DSP of the first RF tuner circuit is configured to implement a phase diversity mode by combining data from the first type RF signal streaming data received from the second DSP with data from the digital signal derived from the received first type RF signal received from the ADC of the first RF tuner circuit to produce a combined first type signal output in modulated or demodulated form;

where the first DSP of the first RF tuner circuit is coupled to at least one of provide the combined first type signal output in demodulated form to a host processing device, provide the combined first type signal output in modulated form to a third RF tuner circuit across a second segment of the first IC communication link, or a combination thereof.

23. The system of claim 22, where each of the first and second RF tuner circuits further comprises at least one separate processing device from any DSP of the first and second RF tuner circuits and that is configured to control operation of its respective first or second RF tuner circuit, and where the separate processing device of the second RF tuner circuit is configured to provide non-streaming packetized control and/or status message data across the first segment of the first IC communication link to the separate processing device of the first RF tuner simultaneously with the first type RF signal streaming data provided across the first segment of the first IC communication link to the first DSP of the first RF tuner circuit.

24. A method, comprising:
simultaneously communicating at least one of digital streaming data, non-streaming digital packetized data, or a combination thereof between at least two radio frequency (RF) tuner circuits across a first segment of a first inter-chip (IC) communication link and across a first segment of a second IC communication link;
receiving RF signals of a RF spectrum at a RF input of each of the two RF tuner circuits; and
producing at least one digital output from each given one of the two RF tuner circuits that is based at least in part on the RF signals received by the RF input of the given RF tuner circuit, the digital streaming data received by the given RF tuner circuit from the other RF tuner circuit across at least one of the first segment of the first IC communication link or the first segment of the second IC communication link, or a combination thereof.

25. The method of claim 24, where the RF signals received by the RF input of each of the RF tuner circuits comprise at least a first type RF signal and a second type RF signal that is different than the first type RF signal; and where the method further comprises communicating digital streaming data related to the first type RF signal between the two RF tuner circuits across the first segment of the first IC communication link simultaneously and asynchronously with communicating digital streaming data related to the second type RF signal between the two RF tuner circuits across the first segment of the second IC communication link.

26. The method of claim 25, further comprising using at least one processing device of each given of the RF tuner circuits to control operation of the given RF tuner circuit to selectably implement a phase diversity operating mode in response to one or more control signals received from a host processing device by simultaneously:
controlling a first one of the two RF tuner circuits to combine digital data related to the first type RF signal with the digital streaming data related to the first type RF signal received across the first segment of the first IC communication link to produce a first digital output signal to a host processing device from the first RF tuner; and
controlling a second one of the two RF tuner circuits to combine digital data related to the second type RF signal with the digital streaming data related to the second type RF signal received across the first segment of the second IC communication link to produce a second digital output signal to a host processing device from the second RF tuner;
where the first RF tuner circuit is controlled to combine digital data related to the first type RF signal with the digital streaming data related to the first type RF signal in a manner that is asynchronous to the combination by the second RF tuner circuit of the digital data related to the second type RF signal with the digital streaming data related to the second type RF signal.

27. The method of claim 25, further comprising using at least one processing device of each given of the RF tuner circuits to control operation of the given RF tuner circuit to respond to one or more control signals received from a host processing device by selectably implementing at least one of an alternate frequency scan mode, a phase diversity operating mode, a switched antenna diversity mode, or a combination thereof.

28. The method of claim 25, further comprising:
using at least one processing device of each given one of the two RF tuner circuits to control operation of the given RF tuner circuit; and
communicating non-streaming digital packetized message and/or control data between the processing devices of the two RF tuner circuits across at least one of the first segment of the first IC communication link or the first segment of the second IC communication link simultaneously while communicating at least one of the digital streaming data related to the first type RF signal across the first segment of the first IC communication link between the two RF tuner circuits or digital streaming data related to the second type RF signal across the first segment of the second IC communication link between the two RF tuner circuits.

29. The method of claim 24, further comprising accessing debug information stored on an internal data buffer of each of the two RF tuner circuits via digital streaming data transmitted across at least one of the first segment of the first IC communication link or the first segment of the second IC communication link simultaneously and asynchronously with transmitting digital streaming data related to the first or second type RF signal across the same first segment of the first IC communication link or the first segment of the second IC communication link.

30. The method of claim 24, further comprising selectably coupling the RF input of at least one of the two RF tuner circuits to receive the RF signals of the RF spectrum either directly from a RF antenna or from the other RF tuner circuit through a RF feed-through path.

* * * * *